(12) United States Patent
Lombardo

(10) Patent No.: US 10,441,042 B1
(45) Date of Patent: Oct. 15, 2019

(54) MOBILE DEVICE CASE

(71) Applicant: Sam Lombardo, Brunswick, OH (US)

(72) Inventor: Sam Lombardo, Brunswick, OH (US)

(*) Notice: Subject to any disclaimer, the term of this patent is extended or adjusted under 35 U.S.C. 154(b) by 0 days.

(21) Appl. No.: 16/363,212

(22) Filed: Mar. 25, 2019

Related U.S. Application Data

(60) Provisional application No. 62/647,132, filed on Mar. 23, 2018.

(51) Int. Cl.
A45C 11/00 (2006.01)
H04M 1/02 (2006.01)

(52) U.S. Cl.
CPC ......... *A45C 11/00* (2013.01); *A45C 2011/002* (2013.01); *A45C 2200/10* (2013.01); *H04M 1/0202* (2013.01)

(58) Field of Classification Search
CPC .............. A45C 11/00; A45C 2011/002; A45C 2200/10; H04M 1/0202
See application file for complete search history.

(56) References Cited

U.S. PATENT DOCUMENTS

| 8,676,281 | B1* | 3/2014 | Caulder | H04M 1/0283 |
| | | | | 455/575.1 |
| 9,008,738 | B1* | 4/2015 | Dong | A45C 11/00 |
| | | | | 455/575.1 |
| 2013/0023313 | A1* | 1/2013 | Kim | H04M 1/04 |
| | | | | 455/575.8 |

* cited by examiner

Primary Examiner — Khai M Nguyen
(74) Attorney, Agent, or Firm — Lombard & Geliebter LLP; Eric J. Huang, Esq.

(57) ABSTRACT

A mobile device case is provided comprising an outer rim adapted to cover the sides of the mobile device, and a back cover attached to the outer rim to cover the rear face of the mobile device. The back cover, outer rim, and rear face of the mobile device define a slot therebetween, and the outer rim and the back cover further define a slot opening therebetween and the rear face of the mobile device at a side of the back cover, the slot opening providing access to the slot. The back cover further comprises a locking mechanism at a side of the back cover opposite the slot opening. The back cover is adapted to removably receive a design insert in the slot through the slot opening and releasably secure the design insert at an edge of the design insert by the locking mechanism.

20 Claims, 5 Drawing Sheets

MOBILE DEVICE CASE

CROSS REFERENCE TO RELATED APPLICATION

This application claims the benefit of U.S. Provisional Application No. 62/647,132, filed Mar. 23, 2018, the disclosure of which is hereby incorporated by reference in its entirety.

BACKGROUND OF THE INVENTION

Field of the Invention

The present invention generally relates to mobile phone accessories and more specifically the present invention relates to a mobile device case having changeable design inserts.

Description of the Related Art

Mobile phones are the most widely used devices across the globe. With the continuous advancement in technology and the extensive coverage of internet, the mobile phones have turned into smartphones and have become an indispensable part of the human life. The development in technology has led the shift from keypad-based input mobile phones to the full screen display, touch-based input smartphones. However, with tons of features and the associated sensitive hardware components included in the smartphones, it is of utmost importance to protect the mobile phone/smartphone from any damage. With full screen displays and a number of sensors involved, the smartphones today are more prone to damage. The high pricing of the smartphone makes the loss even more disturbing for the customer.

In order to protect the mobile phones, the mobile covers were introduced in the market. They not only provide necessary protection from any sort of damage but also add to the aesthetics of the mobile phone. The users now-a-days use mobile covers to change the look the smartphones from time to time. But as the smartphones are developing, the mobile covers are also being improved continuously as per the users' requirement. Now-a-days various flip covers are available which protect the screen of the mobile phone and also allows user to operate the mobile phone at the same time. Various covers are available that respond to the sensor-based features and gestures of the mobile phone. 3D designs and custom made designs are being printed on the back of the cover to improve the aesthetics of the mobile phones. Various bumpers and shock absorbing materials have been used to prevent damage to the smartphones in case they fall/hit a hard surface.

But all these features are increasing the cost of the mobile covers. Users have specific interests and desires that drive their decision making, and desire to change their mobile cover design. But mobile covers have become very expensive, and users who would like to change the design of their phone case need to buy a new mobile cover, even if the previous case is still in working condition. This becomes an unnecessary expense for the user as he/she has to pay for a new cover and the present mobile cover, although in a working condition, goes waste (as they cannot be used with any other mobile phone model).

Therefore, the present invention seeks to provide a mobile device case having changeable design inserts, that will overcome or substantially ameliorate at least some of the deficiencies of the prior art, or at least provide a viable alternative.

SUMMARY OF THE INVENTION

It is therefore an object of the present invention to provide a mobile device case having changeable design inserts.

The present invention meets the object by providing a mobile device case having changeable design inserts. The mobile device case comprises an outer rim adapted to cover edges of a mobile device, the outer rim having first one or more openings, a back cover having a first side and a second side, attached with the outer rim to cover the back of the mobile device, forming a slot between the back of the mobile device and the back cover, the back cover including second one or more openings and a locking mechanism at the first side of the back cover, and a design insert adapted to be removably received in the slot through a slot opening at the side and secured using the locking mechanism, the design insert having third one or more openings in line with the second one or more openings.

In one embodiment, the mobile device case further comprises a front cover attached with the outer rim, adapted to cover a screen of the mobile device.

In one embodiment, a case is provided having an outer rim adapted to cover the plurality of sides of a mobile device around the perimeter thereof. The outer rim has one or more openings therein. The case has a back cover having a first side and a second side opposite the first side. The back cover is attached to the outer rim to cover the rear face of the mobile device and has one or more openings therein. The back cover, outer rim, and rear face of the mobile device define a slot therebetween. The outer rim and the back cover further define a slot opening therebetween and the rear face of the mobile device at the second side of the back cover, the slot opening providing access to the slot. The back cover has a locking mechanism at the first side of the back cover opposite the slot opening. The back cover is adapted to removably receive a design insert in the slot through the slot opening and releasably secure the design insert at an edge of the design insert by the locking mechanism.

In another embodiment, the case has a design insert adapted to be removably received in the slot through the slot opening and releasably secured at the edge of the design insert by the locking mechanism. The design insert has one or more openings in line with the one or more openings in the back cover. In another embodiment, the design insert has a first face with a graphic. In another embodiment, the design insert has a second face with a graphic.

In another embodiment, the case has a front cover attached to the outer rim. In another embodiment, the edges of the front cover are attached to the edges of the outer rim using a snap fit mechanism. In another embodiment, the front cover is attached to the outer rim at a side of the outer rim, and the front cover is adapted to flip about the attached side. In another embodiment, the front cover is transparent. In another embodiment, a portion of the front cover is transparent and another portion of the front cover is opaque.

In another embodiment, the back cover of the case is attached to the outer rim except for at the second side. In another embodiment, the outer rim and back cover are permanently attached. In another embodiment, the outer rim and back cover are an integral unit.

In another embodiment, a case is provided having an outer rim adapted to cover the plurality of sides of a mobile device around the perimeter thereof. The outer rim has one or more openings therein. The case has a back cover having a first side and a second side opposite the first side. The back cover is attached to the outer rim to cover the rear face of the mobile device and has one or more openings therein. The back cover, outer rim, and rear face of the mobile device define a slot therebetween. The outer rim and the back cover further define a slot opening therebetween and the rear face of the mobile device at the second side of the back cover, the slot opening providing access to the slot. The back cover has a locking mechanism at the first side of the back cover opposite the slot opening. The case has a design insert adapted to be removably received in the slot through the slot opening and releasably secured at an edge of the design insert by the locking mechanism. The design insert has one or more openings in line with the one or more openings in the back cover.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which.

These and other features, benefits, and advantages of the present invention will become apparent by reference to the following text figure, with like reference numbers referring to like structures across the views.

DETAILED DESCRIPTION OF THE INVENTION

Figure 1:
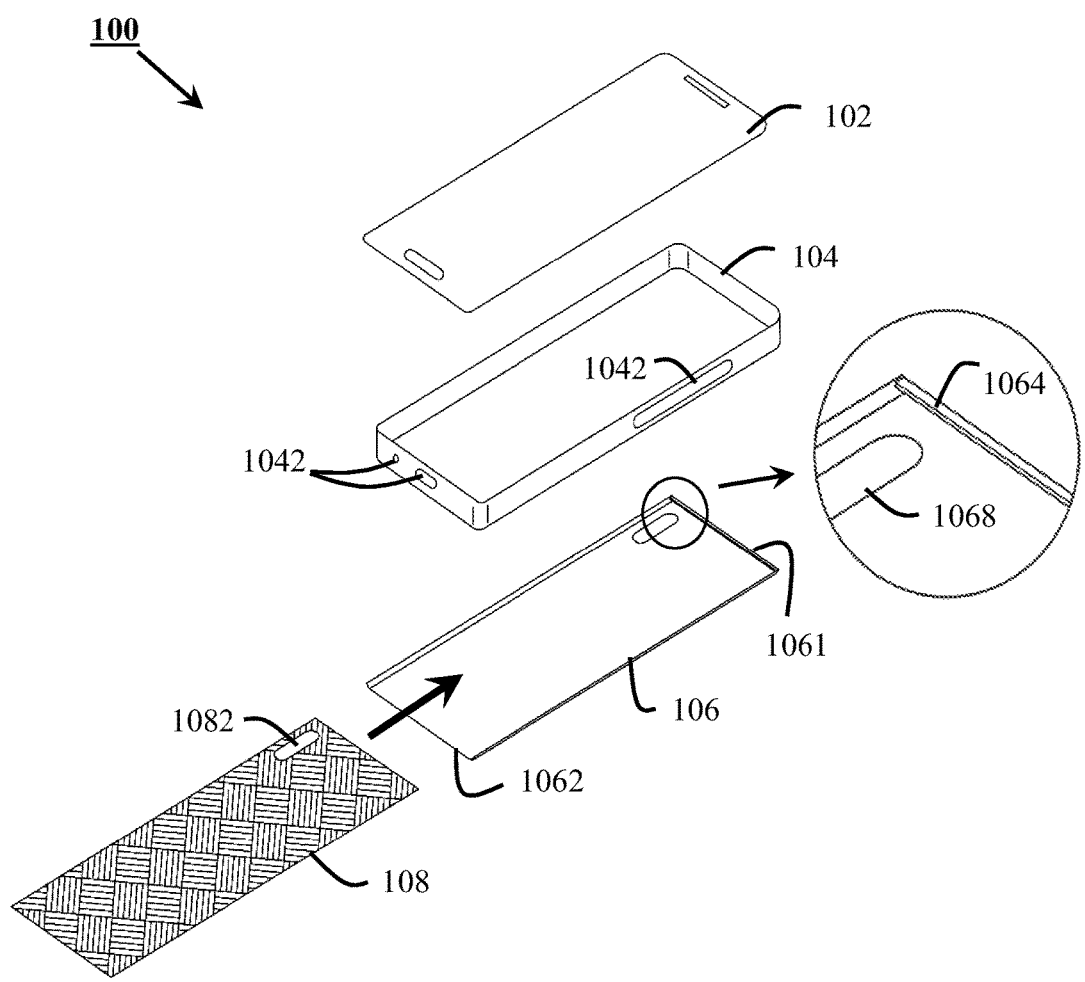
FIG. 1 illustrates an exploded view of a mobile device case, in accordance with an embodiment of the present invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The mobile phone users across the world like to change their mobile phone covers from time to time to change the aesthetics of their phones. But these prove to be costly especially in case where the previous cover is in a working condition. The present invention aims to provide a mobile device case having changeable design inserts. The mobile device may be a smartphone, a tablet etc. These design inserts may be removably inserted in the clear (transparent) back cover and secured using a locking mechanism. The clear cover allows the design to be visible at the back of the mobile device, thereby changing the aesthetics of the mobile device case, giving an impression of a new case. Whenever, a user wants to change the design insert, he/she may simply pull out the design insert from the bottom or back of the case and insert a new one. The design inserts may be bought along with the cover or separately, at a relatively low cost as compared to the existing mobile covers.

FIG. 1 illustrates an exploded view of a mobile device case 100, in accordance with an embodiment of the present invention. A mobile device (not shown) may be selected from one of, but not limited to, a smartphone, a tablet or the like. As shown in FIG. 1, the mobile device case 100 having changeable design inserts (herein referred to as "the mobile device case 100") comprises an outer rim 104 adapted to cover edges of the mobile device. The outer rim 104 is adapted to conform to the edges of the mobile device and protect the edges of the mobile device from any damage in case the mobile device falls or strikes a hard/sharp surface. Damage may be a crack, a scratch or a permanent breakage. The shape of the outer rim 104 may vary as per the design of the mobile device. For example, the shape of the outer rim 104 may be selected from one of, but not limited to, a rectangle or a rectangle with round corners or curved edges.

The outer rim 104 includes first one or more openings 1042. The first one or more openings 1042 are provided to allow a user to access the buttons present on the edges of the mobile device such as volume button, power/lock button. Further, the first one or more openings 1042 allow the access of a charging port, a microphone jack and a camera button (in some mobile devices) that are present on the edges of the mobile device. The outer rim 104 may be manufactured using a material selected from one of, but not limited to, plastic, acrylic, rubber or any similar durable and flexible material. Additionally, the mobile device case 100 comprises a front cover 102 attached with the outer rim 104. The front cover 102 is adapted to cover and protect a screen of the mobile device. In one embodiment, edges of the front cover 102 may be attached to the edges of the outer rim 104 using mechanism such as snap fit mechanism etc. and cover the screen of the mobile device.

Figure 2A:
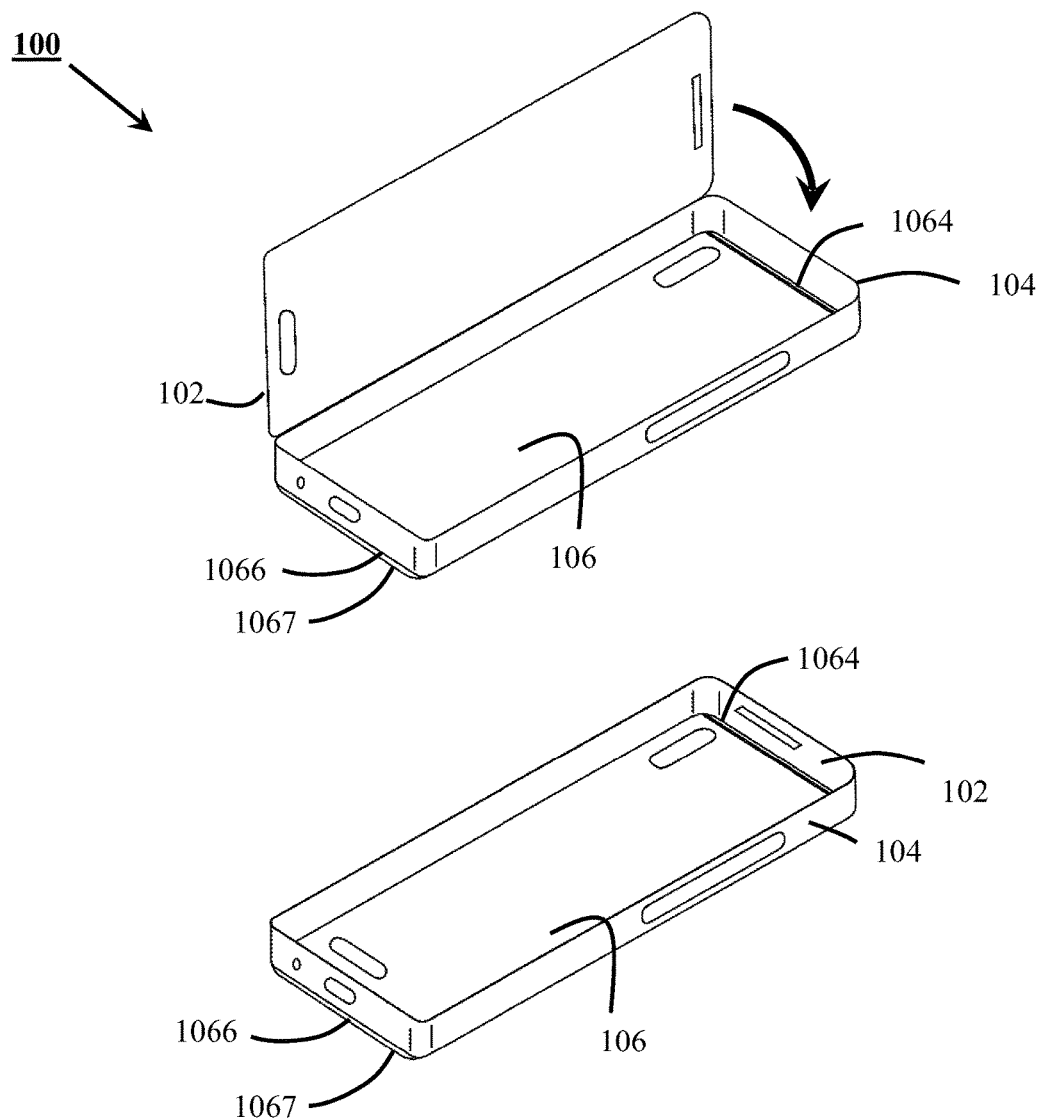
FIG. 2A illustrates the mobile device case, in accordance with another embodiment of the present invention.

The screen may still be able be to receive touch-based inputs through the front cover 102 and therefore, can be operated smoothly. In another embodiment shown in FIG. 2A, only one side of the front cover 102 may be attached to corresponding side of the outer rim 104, enabling the front cover 102 to flip about the attached side (just like in a flip case). In the above mentioned embodiments, the front cover 102 may be completely transparent or only a part of the front cover 102 covering the screen of the mobile device may be transparent while the part covering a home button, a speaker and the proximity sensor may be opaque. The front cover 102 helps to prevent dust or sweat to enter into speaker or stain the screen of the mobile device. The front cover 102 may be manufactured using, but not limited to, plastic or acrylic for the clear front cover 102 and for manufacturing the front cover 102 having both clear and opaque portions, a combination of a fabric (for opaque portion) and a plastic/acrylic may be used. In yet another embodiment, the mobile device case 100 may be an open front case (with no front cover 102).

Returning to FIG. 1, the mobile device case 100 also includes a back cover 106 having a first side 1061 and a second side 1062. The back cover 106 is adapted to cover the back of the mobile device and is transparent. The back cover 106 is configured to be attached with the outer rim 104 and after attaching, a slot 1066 is formed between the back of the mobile device and the back cover 106. As shown best in FIG. 2A, the slot 1066 has a slot opening 1067 at the second side 1062. Returning to FIG. 1, the back cover 106 includes second one or more openings 1068. The second one or more openings 1068 are provided for unobstructed access of mobile device components such as a back camera, loud speaker, fingerprint sensor etc. Also, included in the back cover 106 is a locking mechanism 1064 at the first side 1061 of the back cover 106. The locking mechanism 1064 may be, but not limited to, snap fit mechanism capable of securing an object in position until the object is pulled out. The back cover 106 may be permanently attached with the outer rim 104 using, but not limited to, an adhesive. Material used for making the back cover 106 may be selected from one of, but not limited to, plastic, acrylic, rubber, silicone or any other durable and flexible material. In one embodiment, the back cover 106 and the outer rim 104 are made from the same material and as an integral unit.

Further included in the mobile device case 100 is a design insert 108. The design insert 108 is adapted to be removably received in the slot 1066 through the slot opening 1067 at the second side 1062. The design insert 108 is pushed inside the slot 1066 till the design insert 108 is pushed and secured inside the locking mechanism 1064. The design insert 108 may be of various dimensions depending upon the mobile device and the mobile device case 100. The design insert 108 has third one or more openings 1082. The third one or more openings 1082 are in line with the second one or more openings 1068 to provide unobstructed access of mobile device components such as a back camera, loud speaker, fingerprint sensor etc. Placement of the third one or more opening also varies from one mobile device to another as provision of cameras, fingerprint sensors is different on different models of mobile devices.

Figure 2B:
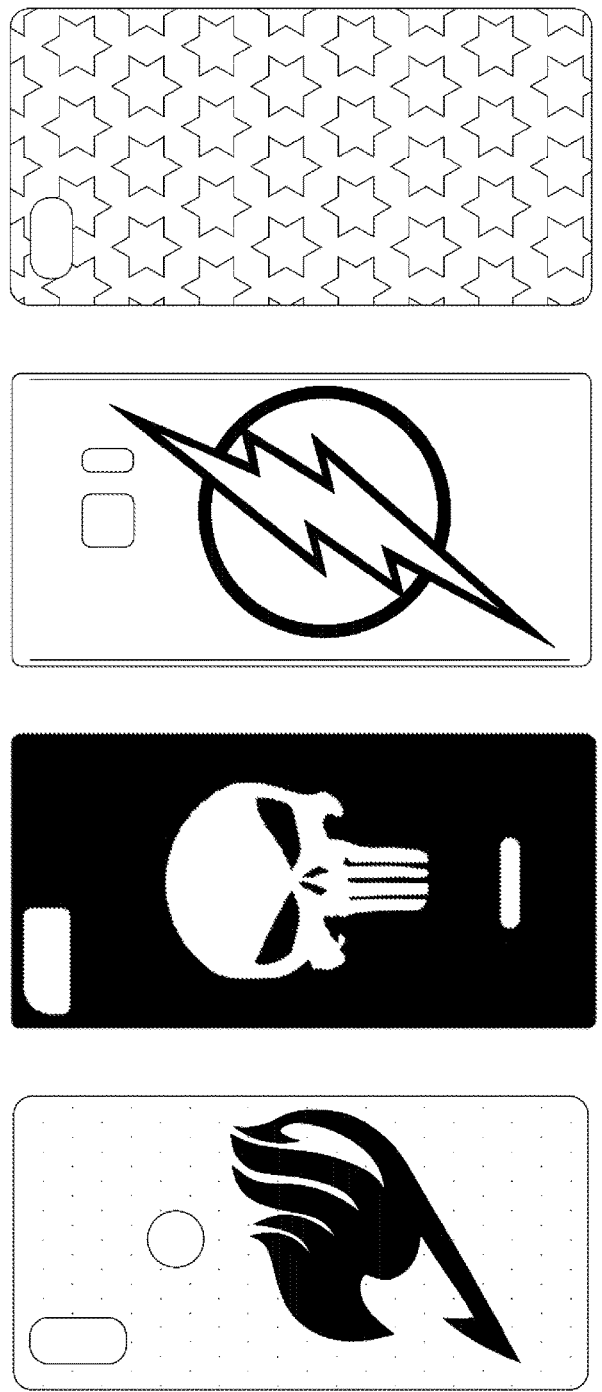
FIG. 2B illustrates several design inserts, in accordance with an embodiment of the present invention.

Various design inserts have been illustrated in FIG. 2B. The design may have different-different graphics printed on the design insert 108. The graphics may be related to, but not limited to, animals, floral, personal hobbies/interests, science, sports, custom graphics, symbols or scripture verses. The design insert 108 may be replaced to change the looks of the mobile device case 100 and consequently the looks of the mobile device itself, as and when required. In one embodiment, the graphics may be provided on both faces of the design insert 108 and this provides an added advantage of flipping the face of the design insert 108 to change the graphics instead of changing the design insert 108. Material used for making design insert 108 may be selected from one of, but not limited to, plastic, acrylic or any other durable and flexible material.

Figure 3:
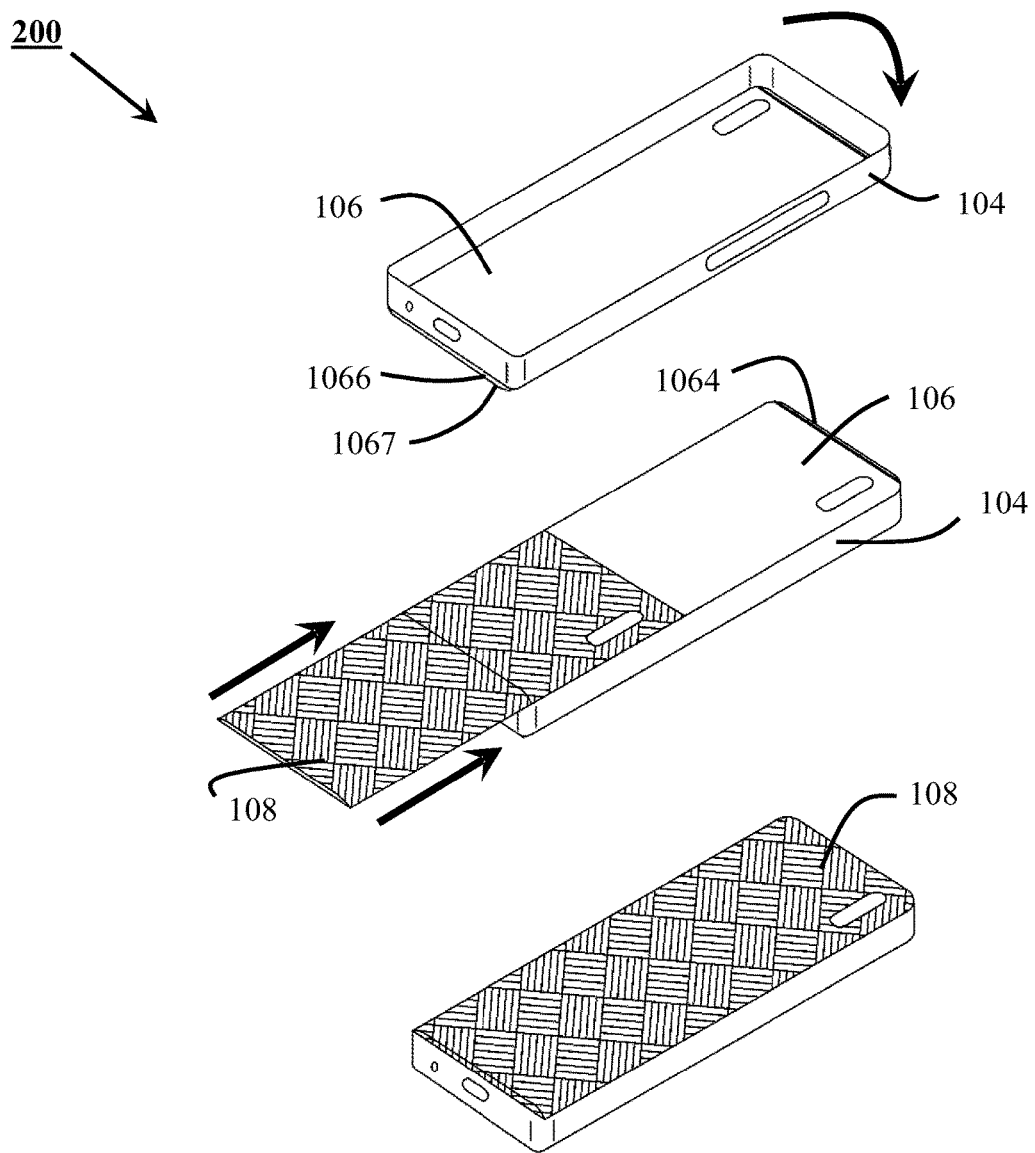
FIG. 3 illustrates an assembly of the mobile device case, in accordance with an embodiment of the present invention.

FIG. 3 illustrates an assembly 200 of the mobile device case 100, in accordance with an embodiment of the present invention. As shown in FIG. 3, the mobile device case 100 (used in this embodiment) is an open front case (without front cover 102). The design insert 108 may be pushed in the slot 1066 through the slot opening 1067, with graphics of the design insert 108 facing the back cover 106. The design insert 108 is pushed till the design insert 108 is received in the locking mechanism 1064. The locking mechanism 1064 keeps the design insert 108 secured in the position. When required the design insert 108 may be pulled out from the slot opening 1067 on second side 1062 and replaced with another design insert 108. Moreover, the edges of the design insert 108 are completely hidden inside the slot 1066 and provide a clean finish. The graphics are visible through the transparent back cover 106. The back cover 106 also gives an advantage of protecting the graphics that often tend to fade away (in case of printed graphics) or are damaged (due to scratches from sharp objects such as keys, coins, pens etc. in pockets) after some time. This prolongs the life of design insert 108.

Figure 4:
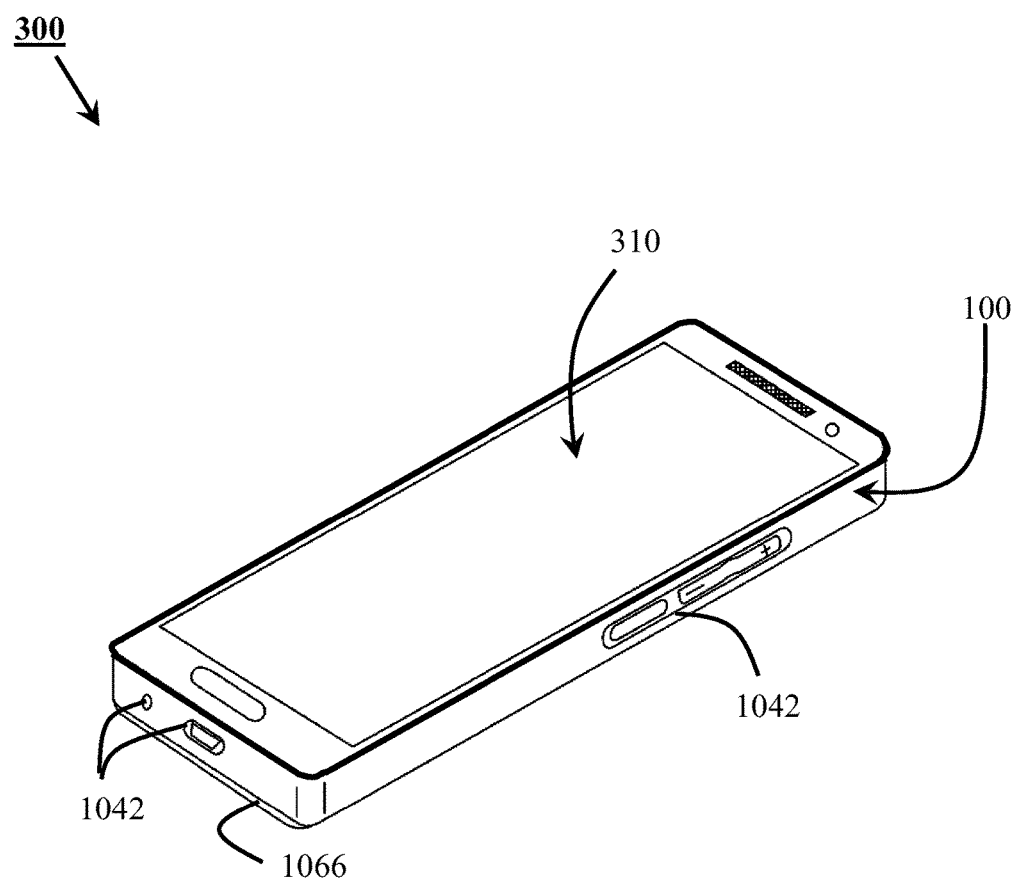
FIG. 4 illustrates an implementation of the mobile device case, in accordance with the embodiment of the present invention.

FIG. 4 illustrates an implementation of the mobile device case 100, in accordance with an embodiment of the present invention. As shown in FIG. 4, after the assembly of the mobile device case 100 is complete, the mobile device 310 may be fitted in the mobile device case 100. One of the edge of the mobile device 310 (screen facing away from the internal portion of the back cover 106) may be received in the outer rim 104 first and then rest of the mobile device may easily be made to conform to the outer rim 104 and thereby received in the mobile device case 100. The first one or more openings 1042 provide access to the volume and power buttons as well as headphone jack and charging port.

The present invention offers a number of advantages. Firstly, the present invention addresses the problem of expensive phone cases. The high cost limits users to change their phone case design on a less frequent basis, even though they would like to do so frequently. The present invention offers cost effective design inserts that allow for users to change the design of their case as often as they would like. The same case can be used for a long time with variety of design inserts. Additionally, the present invention provides versatility. Consumers can collect the different inserts, and switch out as often as they would like. Consumers have many thought processes and life event scenarios that may trigger a desire to change their phone case design.

The present invention is also trendy/customizable. The design inserts may adapt to all current market trends, and also allow for users who may want to order customized inserts with photos, graphics, and other personal interest driven designs. All of the design inserts are collectible, reusable, tradeable and interchangeable within seconds. In addition, the present invention fits well with any age group, especially teens and young adults. There has always been a penchant for collecting and trading items, and this invention follows that train of thought and pairs with a necessity that almost everyone has need of—a solid, durable phone case. The present invention can grow and adapt to the changing marketplace, trends and mobile devices.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A case for a mobile device having front and rear faces, and a plurality of sides between the front and rear faces, the sides forming the perimeter of the mobile device, the case comprising:

an outer rim adapted to cover the plurality of the sides of the mobile device around the perimeter thereof, the outer rim having one or more openings therein; and a back cover comprising a first side and a second side opposite the first side, wherein the back cover is attached to the outer rim to cover the rear face of the mobile device, the back cover having one or more openings therein, the back cover, outer rim, and rear face of the mobile device defining a slot therebetween, the outer rim and the back cover further defining a slot opening therebetween and the rear face of the mobile device at the second side of the back cover, the slot opening providing access to the slot, the back cover further comprising a locking mechanism at the first side of the back cover opposite the slot opening, the back cover adapted to removably receive a design insert in the slot through the slot opening and releasably secure the design insert at an edge of the design insert by the locking mechanism.

2. The case of claim 1, further comprising the design insert, the design insert adapted to be removably received in the slot through the slot opening and releasably secured at the edge of the design insert by the locking mechanism, the design insert having one or more openings in line with the one or more openings in the back cover.

3. The case of claim 2, wherein the design insert comprises a first face, wherein a first graphic is provided on the first face.

4. The case of claim 3, wherein the design insert further comprises a second face, wherein a second graphic is provided on the second face.

5. The case of claim 1, further comprising a front cover attached to the outer rim.

6. The case of claim 5, wherein the edges of the front cover are attached to the edges of the outer rim using a snap fit mechanism.

7. The case of claim 5, wherein the front cover is attached to the outer rim at a side of the outer rim, wherein the front cover is adapted to flip about the attached side.

8. The case of claim 5, wherein the front cover is transparent.

9. The case of claim 5, wherein a first portion of the front cover is transparent and a second portion of the front cover is opaque.

10. The case of claim 1, wherein the back cover is attached to the outer rim except for at the second side.

11. The case of claim 1, wherein the outer rim and back cover are permanently attached.

12. The case of claim 1, wherein the outer rim and back cover are an integral unit.

13. A case for a mobile device having front and rear faces, and a plurality of sides between the front and rear faces, the sides forming the perimeter of the mobile device, the case comprising:

an outer rim adapted to cover the plurality of the sides of the mobile device around the perimeter thereof, the outer rim having one or more openings therein;

a back cover comprising a first side and a second side opposite the first side, wherein the back cover is attached to the outer rim to cover the rear face of the mobile device, the back cover having one or more openings therein, the back cover, outer rim, and rear face of the mobile device defining a slot therebetween, the outer rim and the back cover further defining a slot opening therebetween and the rear face of the mobile device at the second side of the back cover, the slot opening providing access to the slot, the back cover further comprising a locking mechanism at the first side of the back cover opposite the slot opening; and a design insert adapted to be removably received in the slot through the slot opening and releasably secured at an edge of the design insert by the locking mechanism, the design insert having one or more openings in line with the one or more openings in the back cover.

14. The case of claim 13, wherein the design insert comprises a first face, wherein a first graphic is provided on the first face.

15. The case of claim 14, wherein the design insert further comprises a second face, wherein a second graphic is provided on the second face.

16. The case of claim 13, further comprising a front cover attached to the outer rim.

17. The case of claim 16, wherein the front cover is attached to the outer rim at a side of the outer rim, wherein the front cover is adapted to flip about the attached side.

18. The case of claim 16, wherein the front cover is transparent.

19. The case of claim 16, wherein a first portion of the front cover is transparent and a second portion of the front cover is opaque.

20. The case of claim 13, wherein the back cover is attached to the outer rim except for at the second side.

* * * * *